(12) United States Patent
Su et al.

(10) Patent No.: US 7,100,174 B2
(45) Date of Patent: Aug. 29, 2006

(54) CD DRIVE WHICH WILL NOT DAMAGE AN OPTICAL DISK

(75) Inventors: Chien-An Su, Tainan Hsien (TW); Nan-Ching Lee, Kao-Hsiung (TW)

(73) Assignee: BenQ Corporation, Tao-Yuan Hsien (TW)

( * ) Notice: Subject to any disclaimer, the term of this patent is extended or adjusted under 35 U.S.C. 154(b) by 280 days.

(21) Appl. No.: 10/707,224

(22) Filed: Nov. 28, 2003

(65) Prior Publication Data

US 2004/0148615 A1 Jul. 29, 2004

(30) Foreign Application Priority Data

Dec. 5, 2002 (TW) ................. 91135335 A

(51) Int. Cl.
G11B 17/03 (2006.01)
G11B 17/04 (2006.01)
G11B 33/02 (2006.01)

(52) U.S. Cl. ............ 720/604; 720/636; 720/638; 720/706; 360/99.02; 360/99.06

(58) Field of Classification Search ........ 720/604, 720/638, 636, 603, 619, 612, 703, 711, 710, 720/635, 634, 715, 613, 607, 706; 369/261, 369/30.55, 264, 30.57, 30.82, 256, 271.1, 369/282; 360/99.02, 99.06; 359/824
See application file for complete search history.

(56) References Cited

U.S. PATENT DOCUMENTS

| 4,979,161 | A | * | 12/1990 | Verhagen | 720/619 |
| 5,025,339 | A | * | 6/1991 | Kanno et al. | 360/99.06 |
| 5,299,185 | A | * | 3/1994 | Sakurai et al. | 720/628 |
| 5,355,357 | A | * | 10/1994 | Yamamori et al. | 720/646 |
| 5,867,338 | A | * | 2/1999 | Ohira et al. | 720/627 |
| 5,883,871 | A | * | 3/1999 | Shihou | 720/643 |
| 6,069,858 | A | * | 5/2000 | Endo et al. | 720/627 |
| 6,091,573 | A | * | 7/2000 | Pisano et al. | 720/630 |
| 6,301,214 | B1 | * | 10/2001 | Yamashita et al. | 720/628 |
| 6,327,114 | B1 | * | 12/2001 | Otsuki et al. | 360/99.06 |
| 6,538,970 | B1 | * | 3/2003 | Fujiwara et al. | 720/604 |
| 6,907,612 | B1 | * | 6/2005 | Takeshima et al. | 720/605 |
| 2003/0107975 | A1 | * | 6/2003 | Satoh | 369/77.1 |

FOREIGN PATENT DOCUMENTS

| JP | 62028967 A | * | 2/1987 |
| JP | 05205375 A | * | 8/1993 |
| JP | 09293306 A | * | 11/1997 |
| JP | 2001266442 A | * | 9/2001 |
| JP | 2001273700 A | * | 10/2001 |
| JP | 2004241067 A | * | 8/2004 |
| JP | 2005056541 A | * | 3/2005 |

* cited by examiner

*Primary Examiner*—Andrea Wellington
*Assistant Examiner*—Matthew G. Kayrish
(74) *Attorney, Agent, or Firm*—Winston Hsu

(57) ABSTRACT

A CD drive includes an upper cover, a disk tray, a clamp, a push piece, and a guiding rod. The upper cover includes a guiding track and the disk tray is installed below the upper cover in a slidable manner. Additionally, the clamp is installed on the upper cover in a moveable manner, while the push piece is installed on the disk tray. The guiding rod has a first end fixed on the push piece, and a second end slidably installed in the guiding track. When the disk tray slides in or slides out of the upper cover, the guiding rod will slide along the guiding track and move the push piece to push the clamp upward so as to prevent the clamp from scraping an optical disk.

3 Claims, 13 Drawing Sheets

CD DRIVE WHICH WILL NOT DAMAGE AN OPTICAL DISK

BACKGROUND OF INVENTION

1. Field of the Invention

The present invention relates to a CD drive, and more specifically, to a CD drive capable of preventing an optical disk from being scraped.

2. Description of the Prior Art

With the development of digital videos and high quality digital products, compact disks (CD) have insufficient capacity and have been gradually replaced by digital video disks (DVD) having much higher capacity. A typical DVD includes two sides for recording data, so that an optical drive for reading the data stored in the DVD has to be designed to avoid scraping any side of the DVD. However, it is difficult for a prior art optical drive to read the DVD without scraping it. As the prior art optical drive is not placed horizontally, an optical disk will slightly touch a clamp of the optical drive when the optical disk is loaded into or withdrawn from the optical drive, which leads to forming scratches on the optical disk. Accordingly, a surface of the optical disk will be damaged due to long-term scratching, and further, the data stored in the optical disk may be destroyed.

For overcoming the above-mentioned problems, a clamp comprising a magnet to magnetically attract an upper cover for preventing the clamp from scraping an optical disk is disclosed in U.S. Pat. No. 6,246,654. Please refer to FIG. 1. FIG. 1 is a schematic diagram illustrating a prior art CD drive 10 having a magnetic clamp. The CD drive 10 comprises an upper cover 12, a clamp 14, a disk tray 16, a turning table 18, and a motor 20. The clamp 14 is installed inside the upper cover 12 in a movable manner, while the disk tray 16 is movably installed between the clamp 14 and the turning table 18. Additionally, the motor 20 is disposed under the turning table 18 and an optical disk 22 is put on the disk tray 16. When the CD drive 10 tries to read data stored in the optical disk 22, the turning table 18 firstly pushes the optical disk 22 upward and clamps the optical disk 22 to the clamp 14 for removing the optical disk 22 from the disk tray 16. Then, the motor 20 will drive the turning table 18 to rotate and a pick-up head of the CD drive 10 can read the data stored in the optical disk 22 thereby. The clamp 14 further comprises a magnet 24 located around a center of the clamp 14, and a yoke 26 horizontally located on an upper surface of the magnet 24. Furthermore, the yoke 16 is utilized to magnetize the magnet 24 in a vertical direction, so that magnetic attracting forces produced by the magnet 24 can act in the vertical direction.

As shown in FIG. 1, when the optical disk 22 is loaded into or withdrawn from the CD drive 10, the turning table 18 moves downward. Then, the vertical magnetic attracting forces produced by the magnet 24 in the clamp 14 act between the clamp 14 and the upper cover 12 for moving the clamp 14 upward and removing the clamp 14 from the optical disk 22. Thereby, the clamp 14 is magnetically attracted to a lower surface of the upper cover 12. Under this condition, since the yoke 24 is placed horizontally on the upper surface of the magnet 24, the magnetic attracting forces acting upward from the magnet 24 are smaller than those acting downward from the magnet 24. Furthermore, because the magnet 24 attracts the upper cover 12 through an inner wall of the clamp 14, the magnetic attracting forces acting upward from the magnet 24 are further weakened. As a result, the clamp 14 is attracted to the lower surface of the upper cover 12 under relatively weak magnetic attracting forces.

When the CD drive 10 reads the optical disk 22, the turning table 18 moves upward and clamps the optical disk 22 to the clamp 14. Accordingly, the optical disk 22 is lifted above the disk tray 16. At the same time, the turning table 18 comes close to the magnet 24 in the clamp 14 so that a distance between the magnet 24 and the optical disk 22 is smaller than a distance between the magnet 24 and the upper cover 12. Consequently, the clamp 14 is attracted downward to tightly hold the optical disk 22 under the vertical magnetic attracting forces acting between the magnet 24 and the turning table 18. Furthermore, since the magnetic attracting forces acting downward from the magnet 24 are larger than those acting upward from the magnet 24, the clamp 14 can be easily separated from the upper cover 12, and the magnet 24 provides the magnetic attracting forces for the clamp 14 to clamp the optical disk 22 more strongly. In the other words, by moving the turning table 18 upward to come closer to the clamp 14 or moving the turning table 18 away from the clamp 14, operations of descending and ascending the clamp 14 under the vertical magnetic attracting forces produced by the magnet 24 can be reversibly switched from one to the other. The detailed explanation is described in U.S. Pat. No. 6,246,654 and will not be discussed herein.

As mentioned above, the magnet 24 is introduced into the clamp 14 in the prior art. When the optical disk 22 is loaded into or withdrawn from the CD drive 10, the clamp 14 attracts the upper cover 12 through use of the magnetic attracting forces produced by the magnet 24 for preventing the clamp 14 from scraping the optical disk 22. However, the magnetic attracting forces produced by the magnet 24 decrease as temperature increases. Furthermore, the clamp 14 is attracted to the upper cover 12 under relatively weak magnetic attracting forces produced by the magnet 24. When the magnetic attracting forces produced by the magnet 24 are too small to attract the clamp 14 to the upper cover 12, the optical disk 22 will be scraped by the clamp 14. In addition, other corresponding techniques can be acquired from U.S. Pat. No. 6,373,813.

SUMMARY OF INVENTION

It is therefore a primary objective of the claimed invention to provide a CD drive for preventing an optical disk from being scraped to solve the above-mentioned problem.

According to the claimed invention, a CD drive includes an upper cover, a disk tray, a clamp, a push piece, and a guiding rod. The upper cover includes a guiding track and the disk tray is installed below the upper cover in a slidable manner. Additionally, the clamp is installed on the upper cover in a moveable manner, while the push piece is installed on the disk tray. The guiding rod has a first end fixed on the push piece, and a second end slidably installed in the guiding track. When the disk tray slides in or slides out of the upper cover, the guiding rod will slide along the guiding track and move the push piece to push the clamp upward so as to prevent the clamp from scraping an optical disk.

It is an advantage over the prior art that the claimed invention provides a push piece and a guiding track, which is used to guide the push piece to push a clamp for preventing the clamp from scraping a surface of an optical disk when the optical disk is loaded into or withdrawn from the CD drive. As a result, the CD drive of the claimed invention can effectively prevent the clamp from scraping an optical disk.

These and other objectives of the claimed invention will no doubt become obvious to those of ordinary skill in the art after reading the following detailed description of the preferred embodiment, which is illustrated in the multiple figures and drawings.

DETAILED DESCRIPTION

Figure 1:
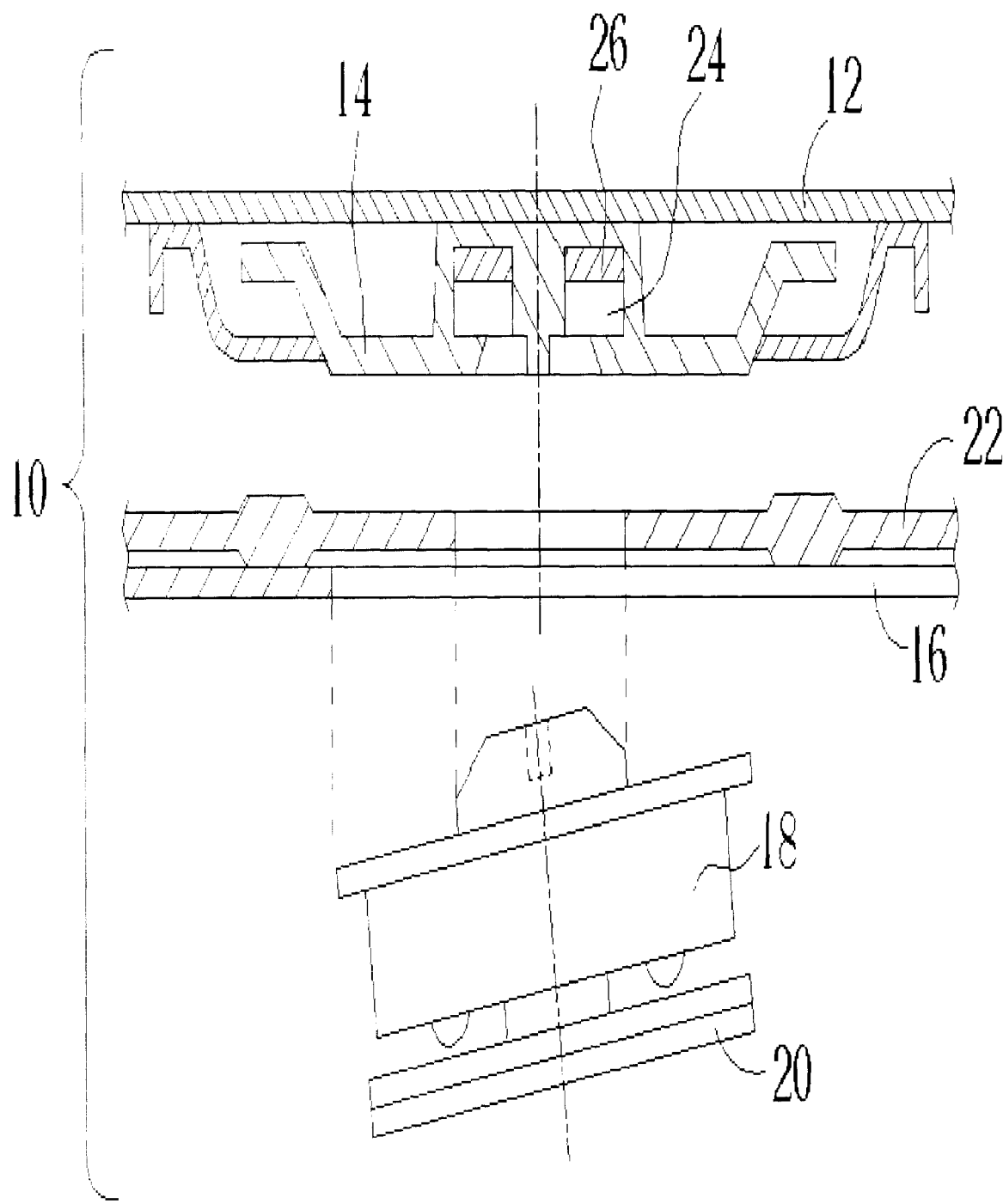
FIG. 1 is a schematic diagram illustrating a prior art CD drive having a magnetic clamp.
Figure 2:
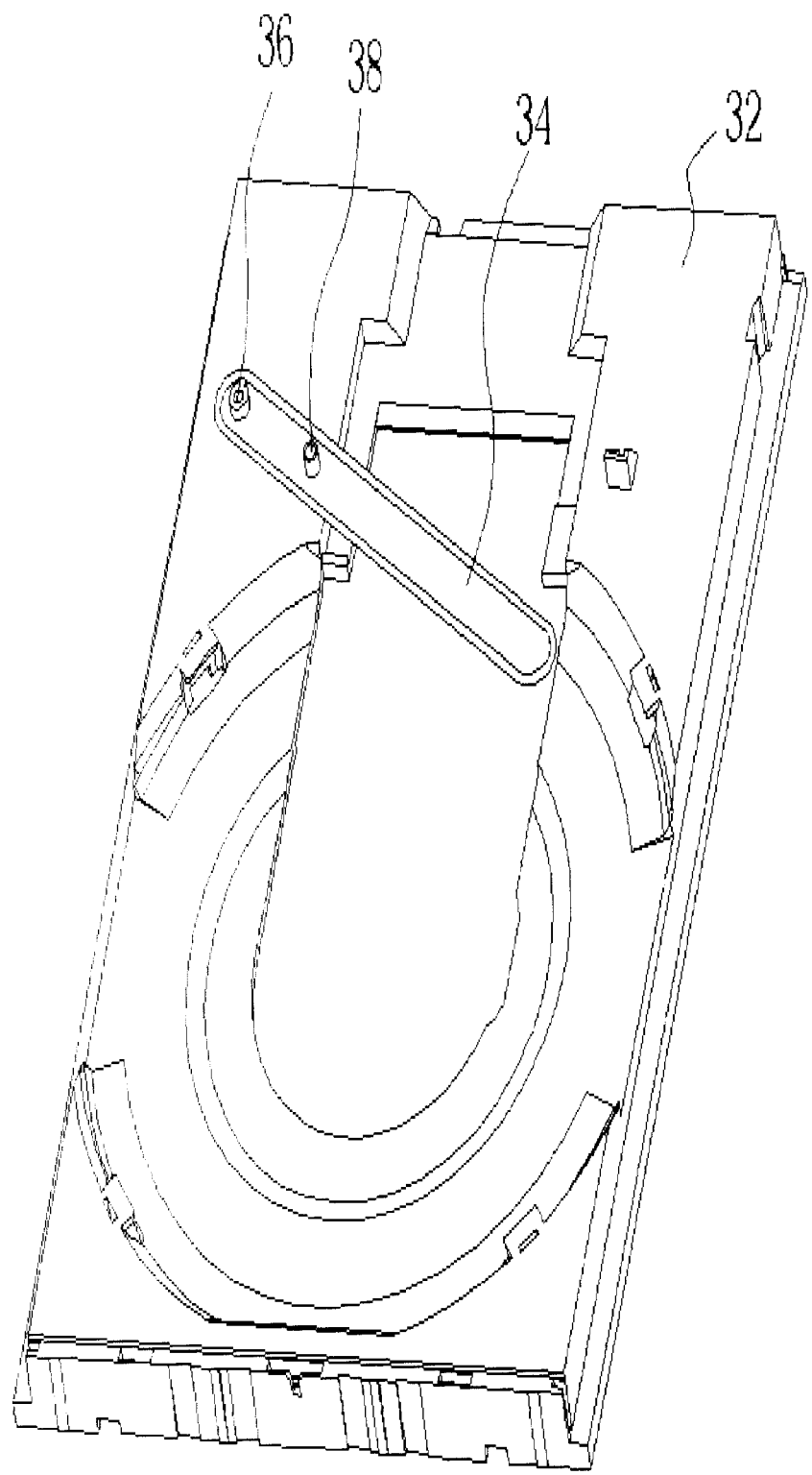
FIG. 2 is a schematic diagram of a disk tray of a CD drive according to the present invention.
Figure 3:
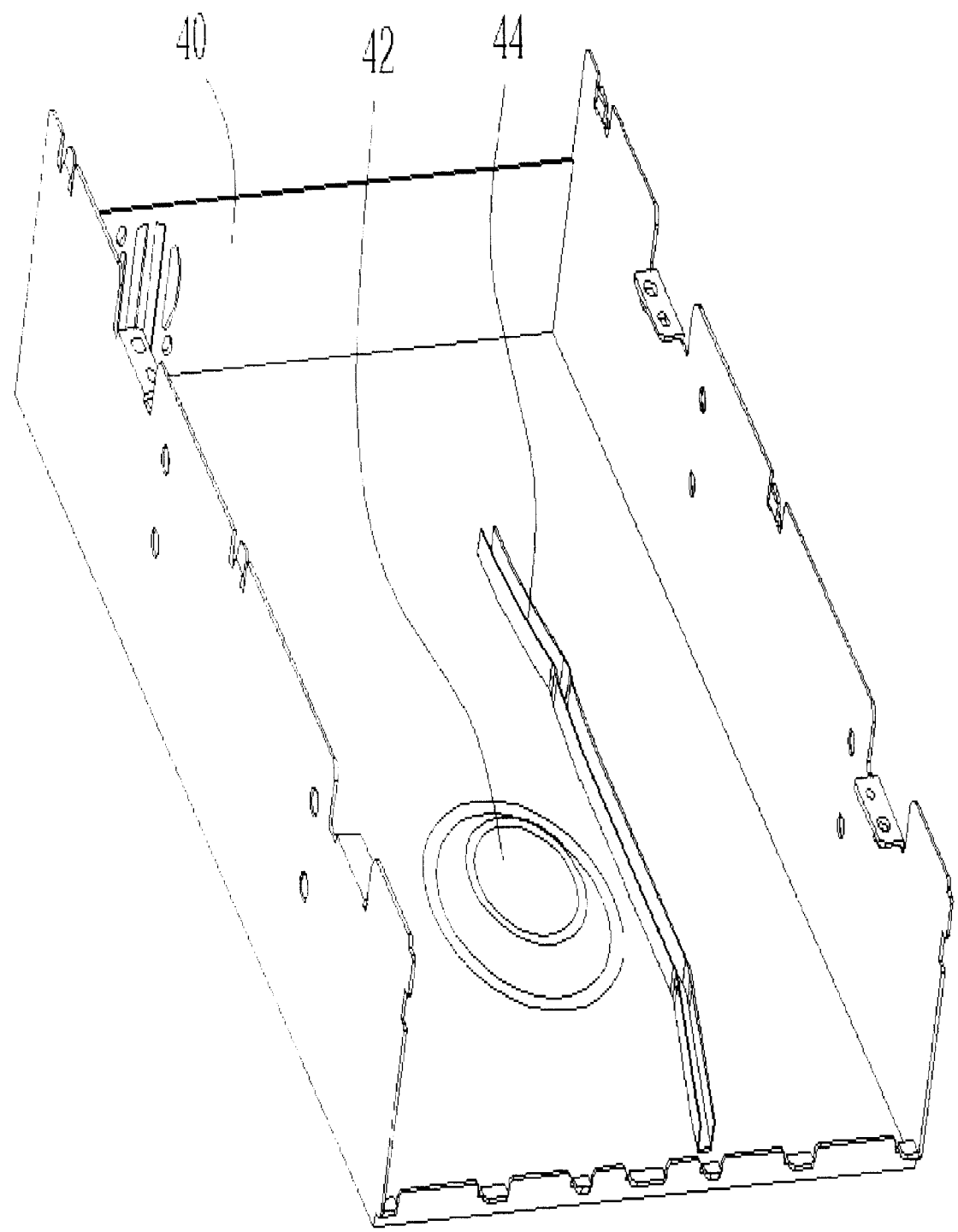
FIG. 3 is a schematic diagram of an upper cover of a CD drive according to the present invention.

Please refer to FIG. 2 and FIG. 3. FIG. 2 is a schematic diagram of a disk tray of a CD drive according to the present invention, and FIG. 3 is a schematic diagram of an upper cover of a CD drive according to the present invention. The disk tray 32 of the CD drive is installed under the upper cover 40 in a slidable manner, and the upper cover 40 functions to protect an optical disk. Generally, the data stored in the optical disk can be read after the optical disk is put on the disk tray 32 and sent into the CD drive. In addition, the disk tray 32 of the CD drive comprises a push piece 34, one end of the push piece 34 being a pivot 36 connected to the disk tray 32 so that the push piece 34 can rotate round the pivot 36, as is shown in FIG. 2. The push piece 34 includes a hole for fixing a first end of a guiding rod 38 on the push piece 34, and a distance between the guiding rod 38 and the pivot 36 is fixed. Furthermore, the upper cover 40 of the CD drive comprises a guiding track 44 and a clamp 42 movably installed on the upper cover 40, as is shown in FIG. 3. When the CD drive tries to read the data stored in the optical disk, a turning table of the CD drive pushes the optical disk upward and clamps the optical disk to the clamp 42. Then, the optical disk is rotated for allowing a pick-up head of the CD drive to read the data stored in the optical disk. Additionally, the guiding track 44 is a groove installed on an inner side of the upper cover 40 for accommodating and guiding a second end of the guiding rod 38, the guiding rod 38 only able to slide along the guiding track 44. Moreover, the guiding track 44 is extended from the rear to the front of the inner side of the upper cover 40. A portion of the guiding track 44 near the clamp 42 is a curved section that is protruded toward one side of the upper cover 40 opposite to the pivot 35 of the push piece 34. As mentioned above, the distance between the pivot 36 and the guiding rod 38 is fixed and the guiding rod 38 can move along the guiding track 44 only. Therefore, as the optical disk is loaded into or withdrawn from the CD drive, the CD drive of the present invention utilizes the curved section of guiding track 44 to guide the guiding rod 38 to turn the push piece 34 so that the push piece 34 can push the clamp 42 upward to prevent the clamp 42 from scraping the optical disk.

Figure 4:
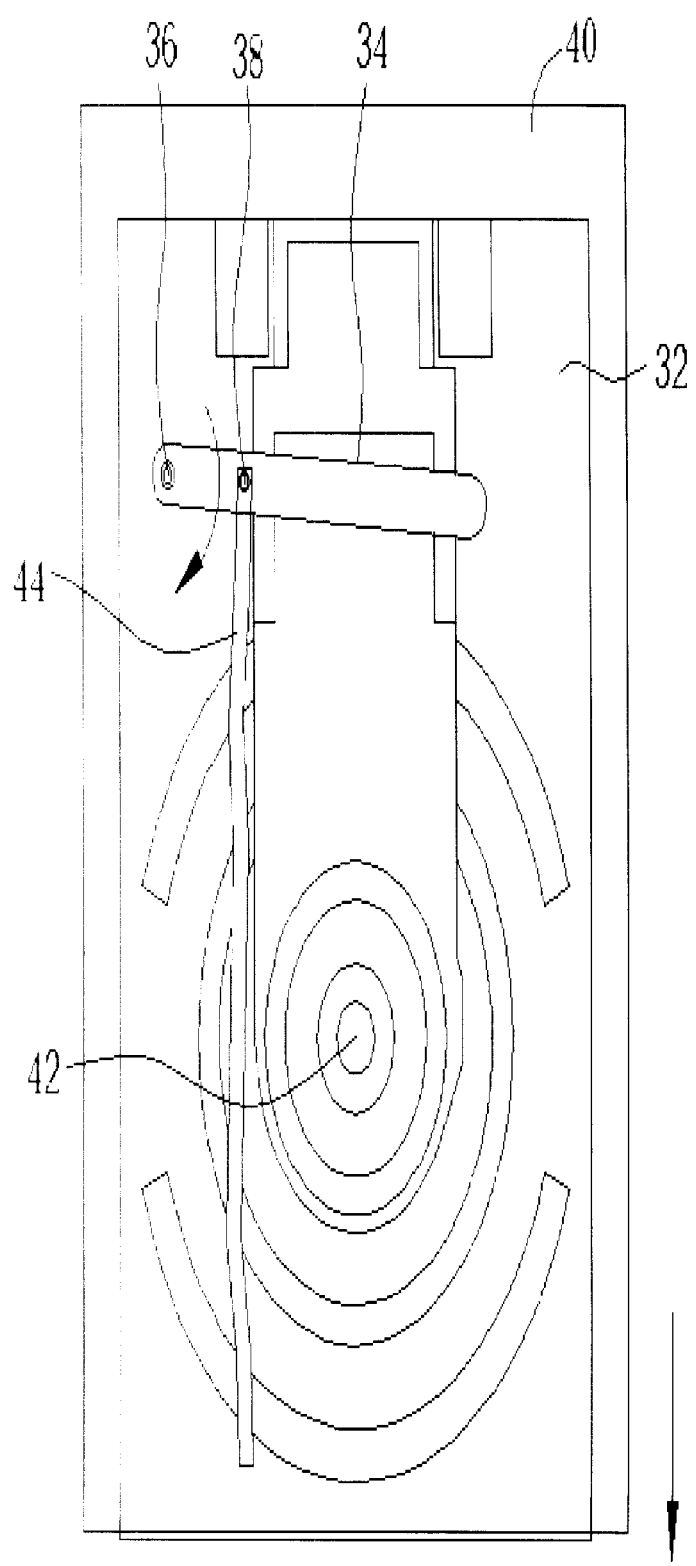
FIG. 4 to FIG. 7 are schematic diagrams of withdrawing an optical disk from a CD drive according to the present invention.
Figure 5:
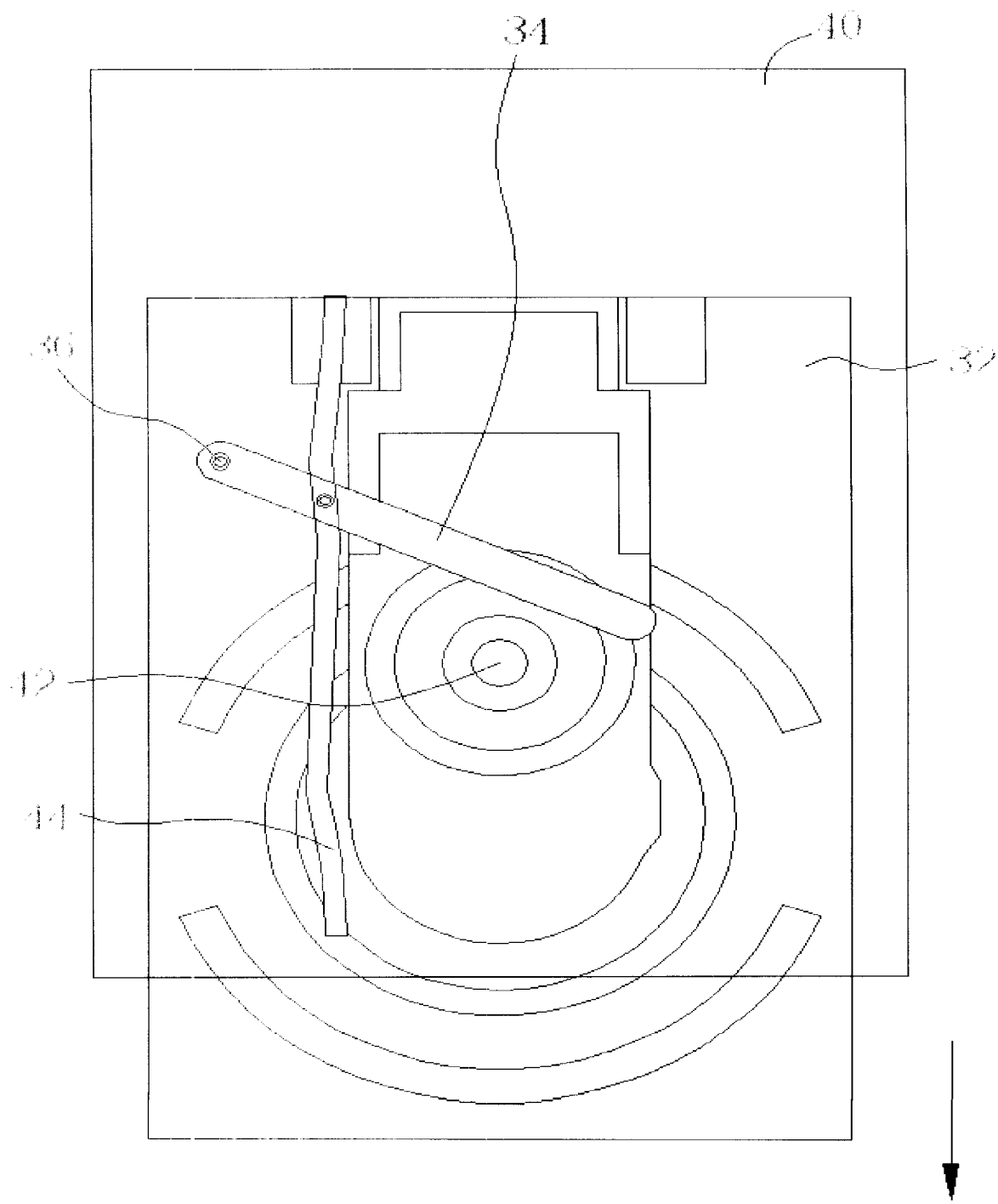
Figure 6:
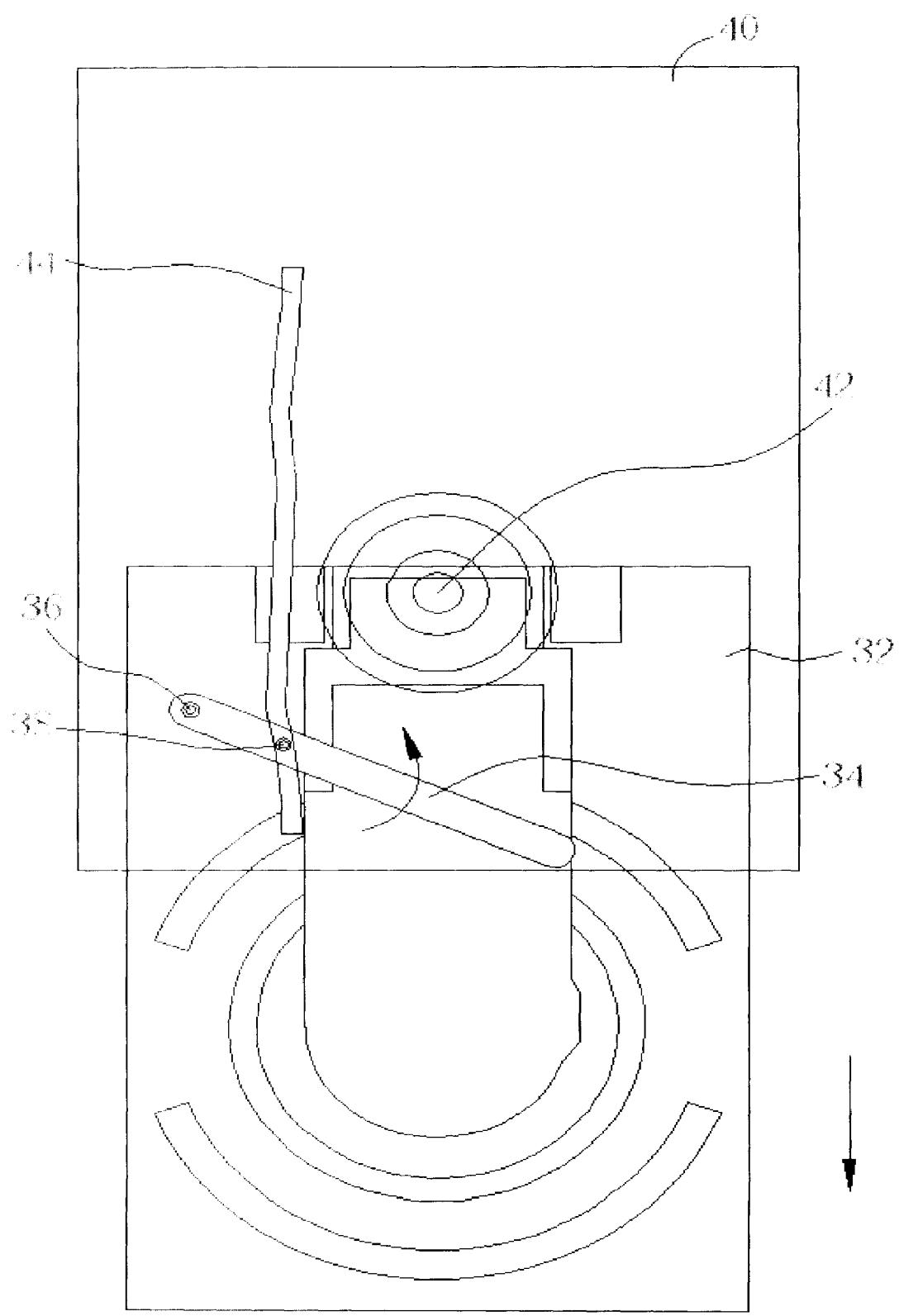
Figure 7:
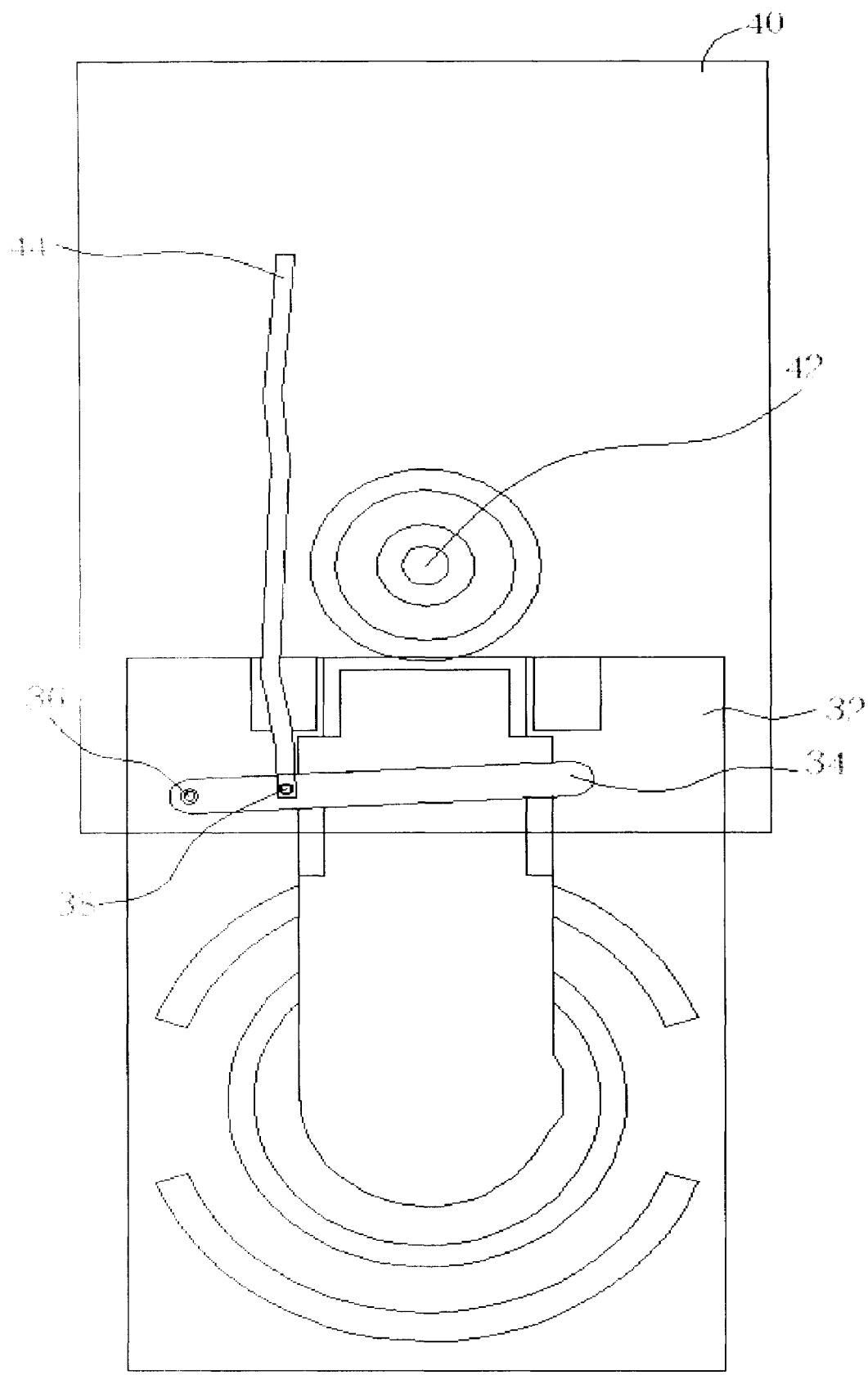
Figure 8:
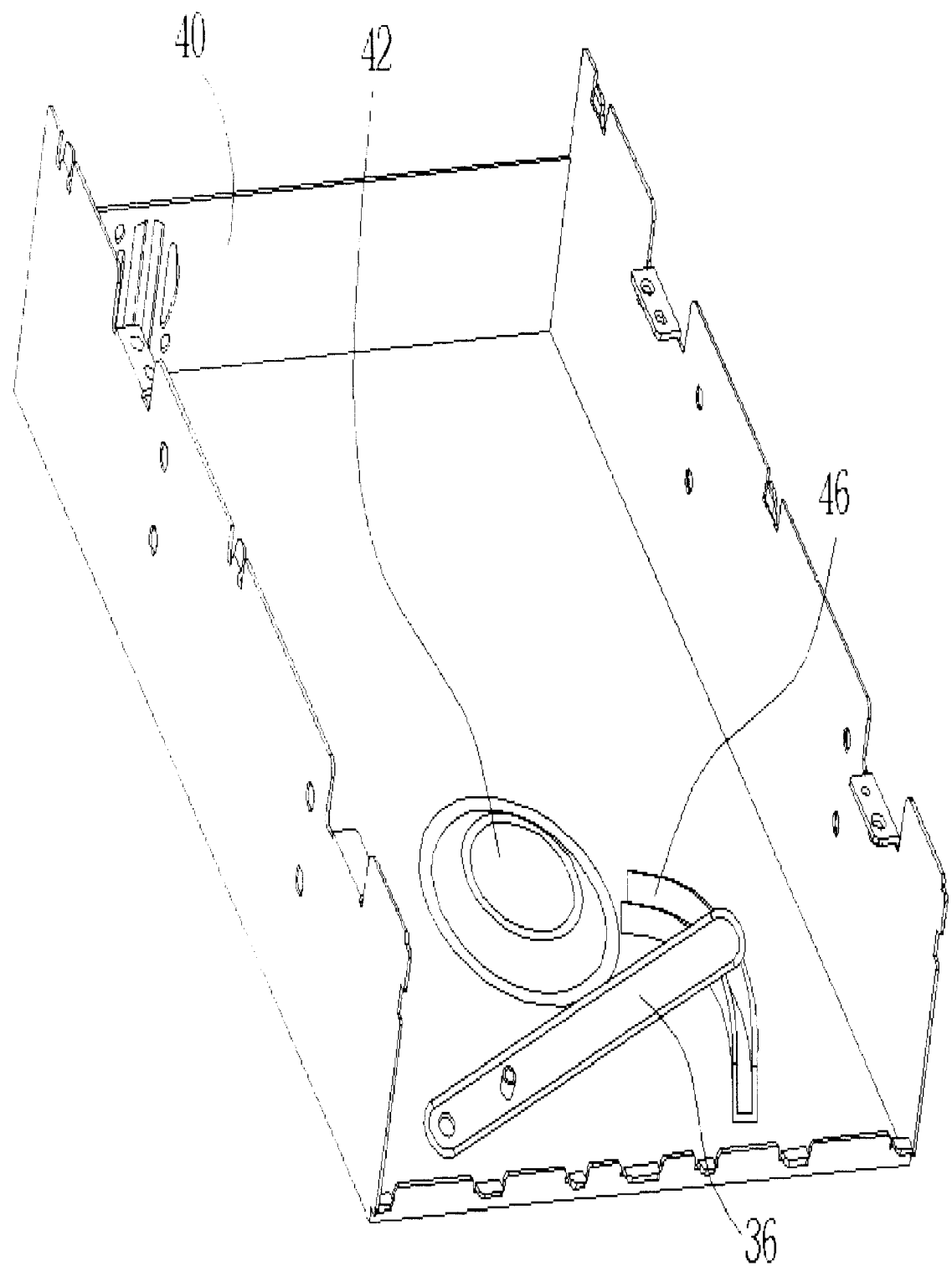
FIG. 8 is a schematic diagram of an upper cover of a CD drive according to the second embodiment of the present invention.
Figure 9:
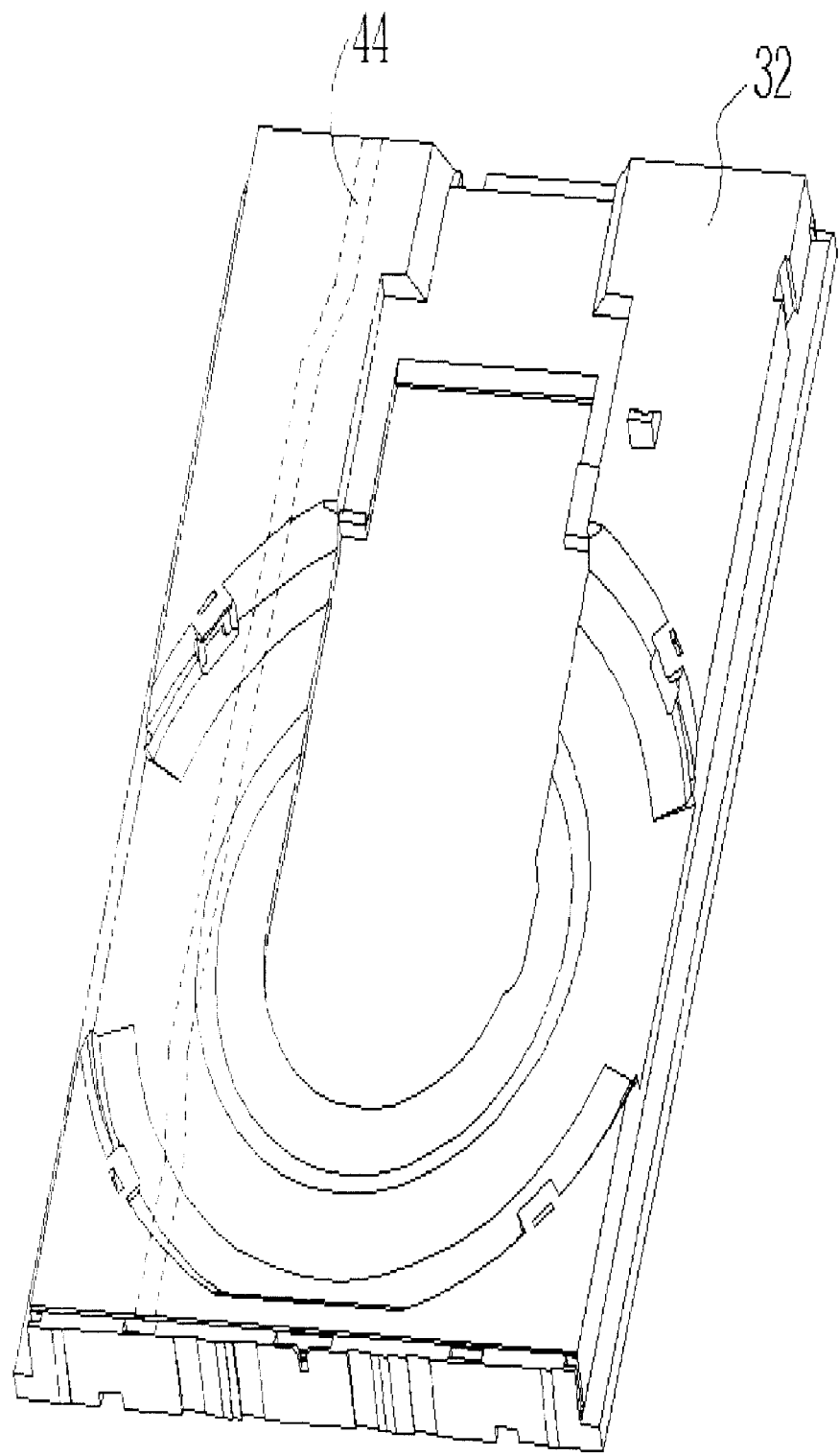
FIG. 9 is a schematic diagram of a disk tray of a CD drive according to the second embodiment of the present invention.

Please refer to FIG. 4 to FIG. 7. FIG. 4 to FIG. 7 are schematic diagrams of withdrawing an optical disk from a CD drive according to the present invention. As shown in FIG. 4, an optical disk is starting to be withdrawn from the CD drive. While the disk tray 32 starts to exit from the CD drive, the upper cover 40 still covers the entire disk tray 32. At the same time, the push piece 34 is traversed over the disk tray 32, but is not completely parallel to a cross section of the disk tray 32. That is, there is a small angle between the push piece 34 and the cross section of the disk tray 32 for avoiding a dead center appearing in that mechanism, and making the guiding track 44 lead the guiding rod 38 to rotate the push piece 34 clockwise. As shown in FIG. 5, the disk tray 32 is exiting from the CD drive. As the disk tray 32 slides out of the upper cover 40, the guiding rod 38 of the push piece 34 moves along a first part of the guiding track 44 that is bent to one side of the upper cover 40 opposite to the pivot 36 of the push piece 34. As a result, the guiding track 44 drives the push piece 34 to turn obliquely to push the clamp 42 upward. As shown in FIG. 6, as long as the optical disk does not completely leave a region covered by the clamp 42 as the disk tray 32 exits from the CD drive, the guiding rod 38 of the push piece 34 moves along a second part of the guiding track 44 that is straight so that the push piece 34 is diagonally located above the disk tray 32 for protecting the optical disk. After the optical disk has left the region covered by the clamp 42, the guiding rod 38 of the push piece 34 moves to a third part of the guiding track 44 that is bent to one side of the upper cover 40 opposite to the pivot 36 of the push piece 34. Therefore, the guiding track 44 can lead the guiding rod 38 to rotate the push piece 34 counterclockwise so that the push piece 34 can return to its initial location. As shown in FIG. 7, the optical disk has been withdrawn from the CD drive completely, and the disk tray 32 has exited from the CD drive. At the same time, the disk tray 32 has completely left the region covered by the upper cover 40, and the push piece 34 has returned to its initial location. In addition, the process for loading an optical disk into the CD drive is reverse to the process for withdrawing an optical disk from the CD drive. That is, the steps of FIG. 7 to FIG. 4 illustrate the process for loading an optical disk into the CD drive, and the detailed description will be hereby omitted. Please refer to FIG. 8 and FIG. 9. FIG. 8 is a schematic diagram of an upper cover of a CD drive according to the second embodiment of the present invention, and FIG. 9 is a schematic diagram of a disk tray of a CD drive according to the second embodiment of the present invention. For convenience of explanation, the same elements of FIG. 2, FIG. 3, FIG. 8, and FIG. 9 are indicated by the same symbols. As shown in FIG. 8, the upper cover 40 comprises a push piece 34, a recess 46, and a clamp 42. The push piece 34 comprises a first end that is fixed on the upper cover 40 by use of a pivot 36, and the push piece 34 can rotate round the pivot 36. Furthermore, a guiding rod 38 is located on the push piece 34 and a distance between the guiding rod 38 and pivot 36 is fixed. Additionally, a second end of the push piece 34 comprises a pillar having one end fixed on the recess 46 in a slidable manner, and the push piece 34 can move along the recess 46 and against an inner side of the upper cover 40. As shown in FIG. 9, the disk tray 32 of the CD drive comprises a guiding track 44 for leading the guiding rod 38 to move along the guiding track 44 only. In the present embodiment, since the disk tray 32 is utilized for supporting an optical disk, the guiding track 44 is installed under the disk tray 32. Furthermore, the guiding track 44 is utilized to move the guiding rod 38 through use of magnetic attracting forces. Accordingly, the guiding rod 38 can be a magnetic rod, and the guiding track 44 can be an iron track. Moreover, the guiding track 44 can be a magnetic track, while the guiding rod 38 is an iron rod, or the guiding track 44 can be a magnetic track, when the guiding rod 38 is a magnetic rod. The guiding track 44 is extended from the front to the rear of the disk tray 32, and comprises a curved section that is located on a region of the disk tray 32 opposite to the clamp 42 of the upper cover 40. The curved section protrudes toward one side of the disk tray 32 opposite to the pivot 35 of the push piece 34. As mentioned above, the distance between the pivot 36 and the guiding rod 38 is fixed, and the guiding rod 38 can only move along the guiding track 44. Therefore, as the optical disk is loaded into or withdrawn from the CD drive, the CD drive of the present invention utilizes the curved section of the guiding track 44 to guide the guiding rod 38 to turn the push piece 34 so that the push piece 34 can push the clamp upward for preventing the clamp 42 from scraping the optical disk.

Figure 10:
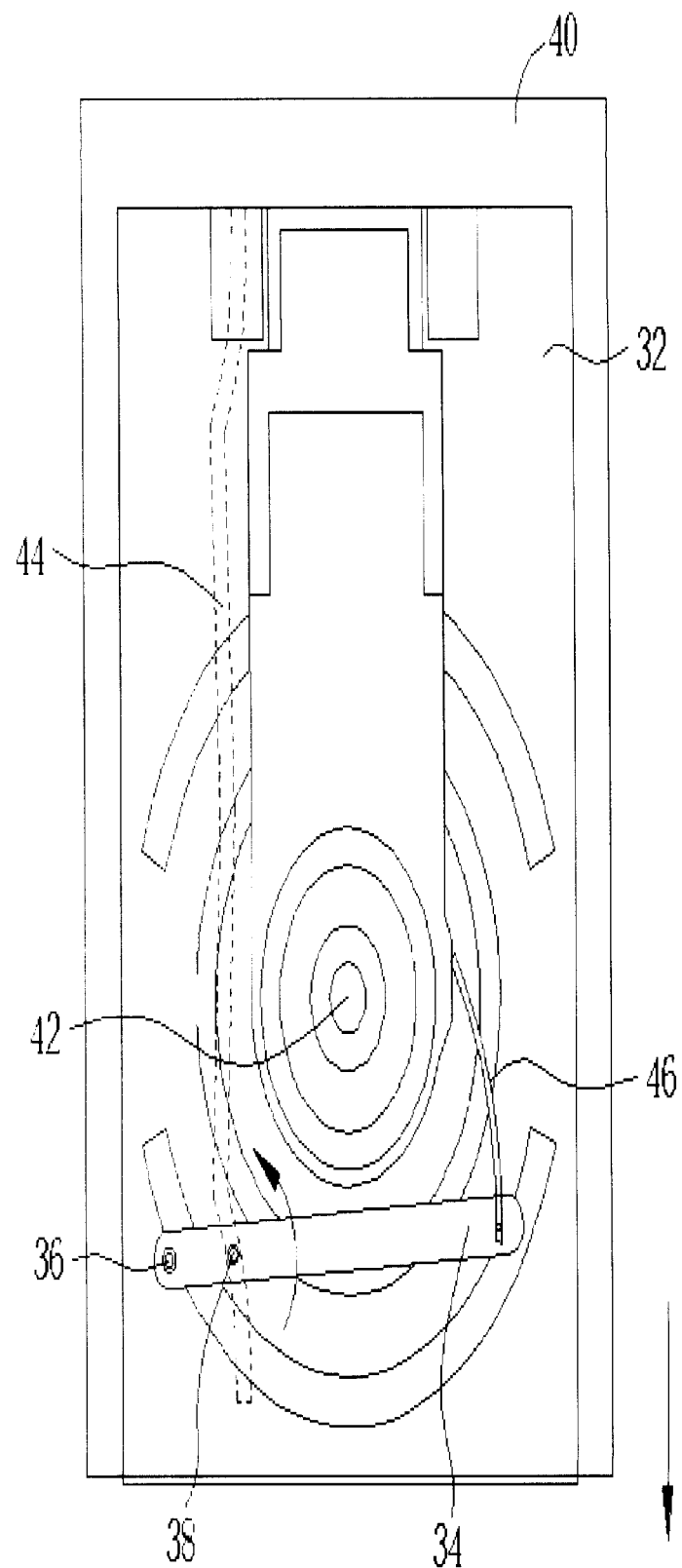
FIG. 10 to FIG. 13 are schematic diagrams of withdrawing an optical disk from a CD drive according to the second embodiment of the present invention.
Figure 11:
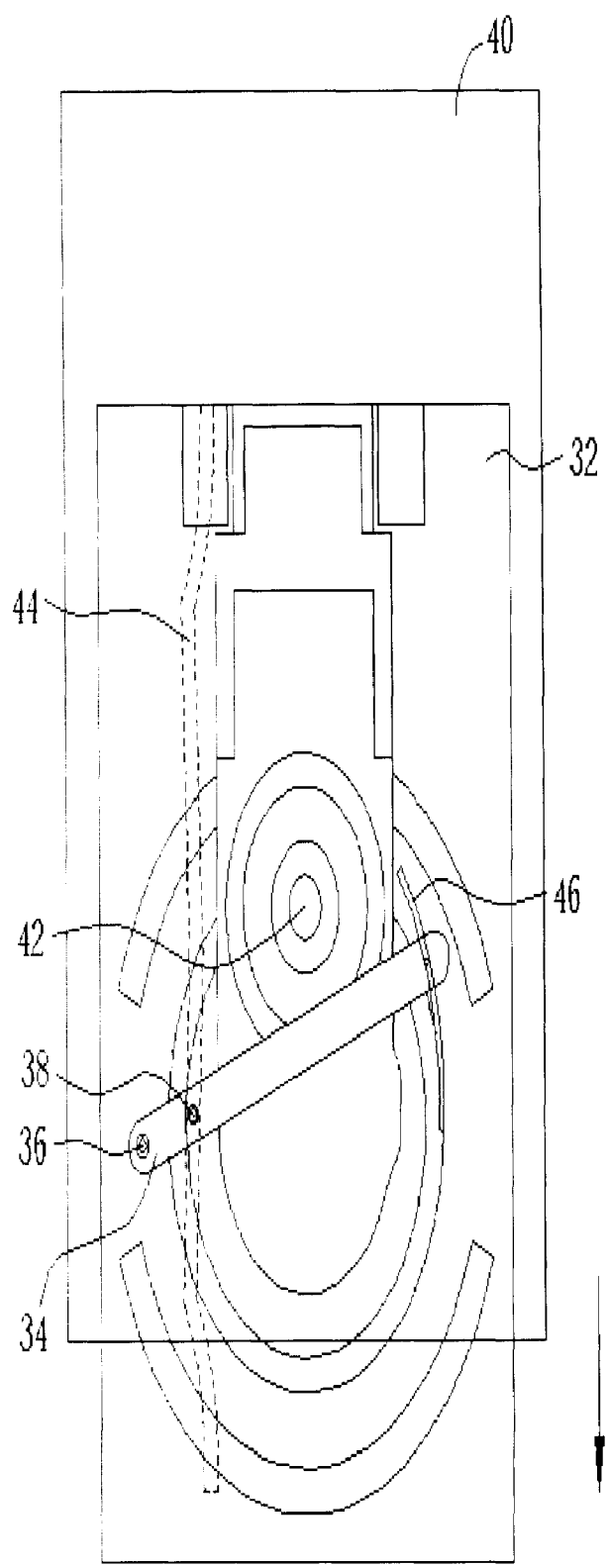
Figure 12:
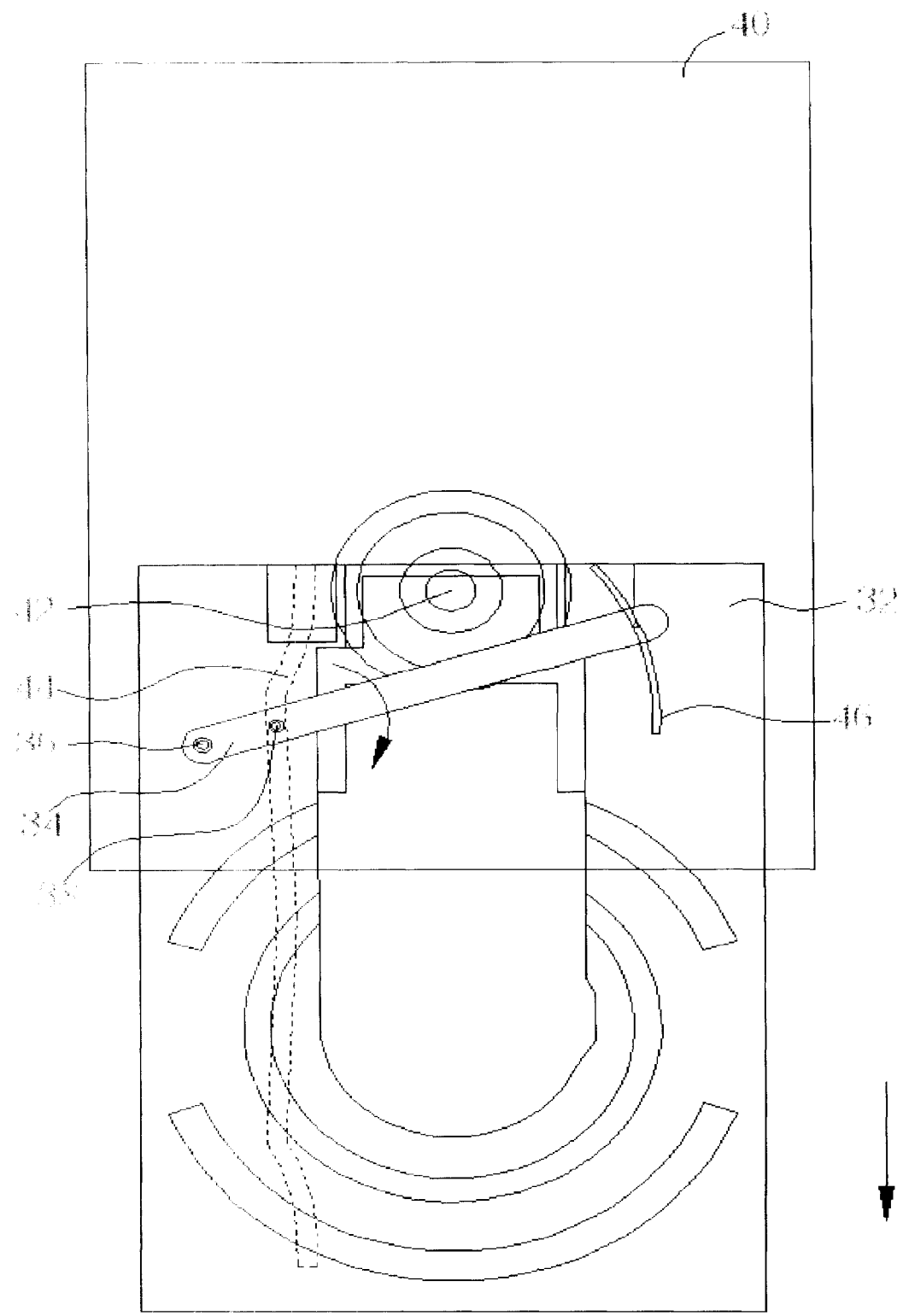
Figure 13:
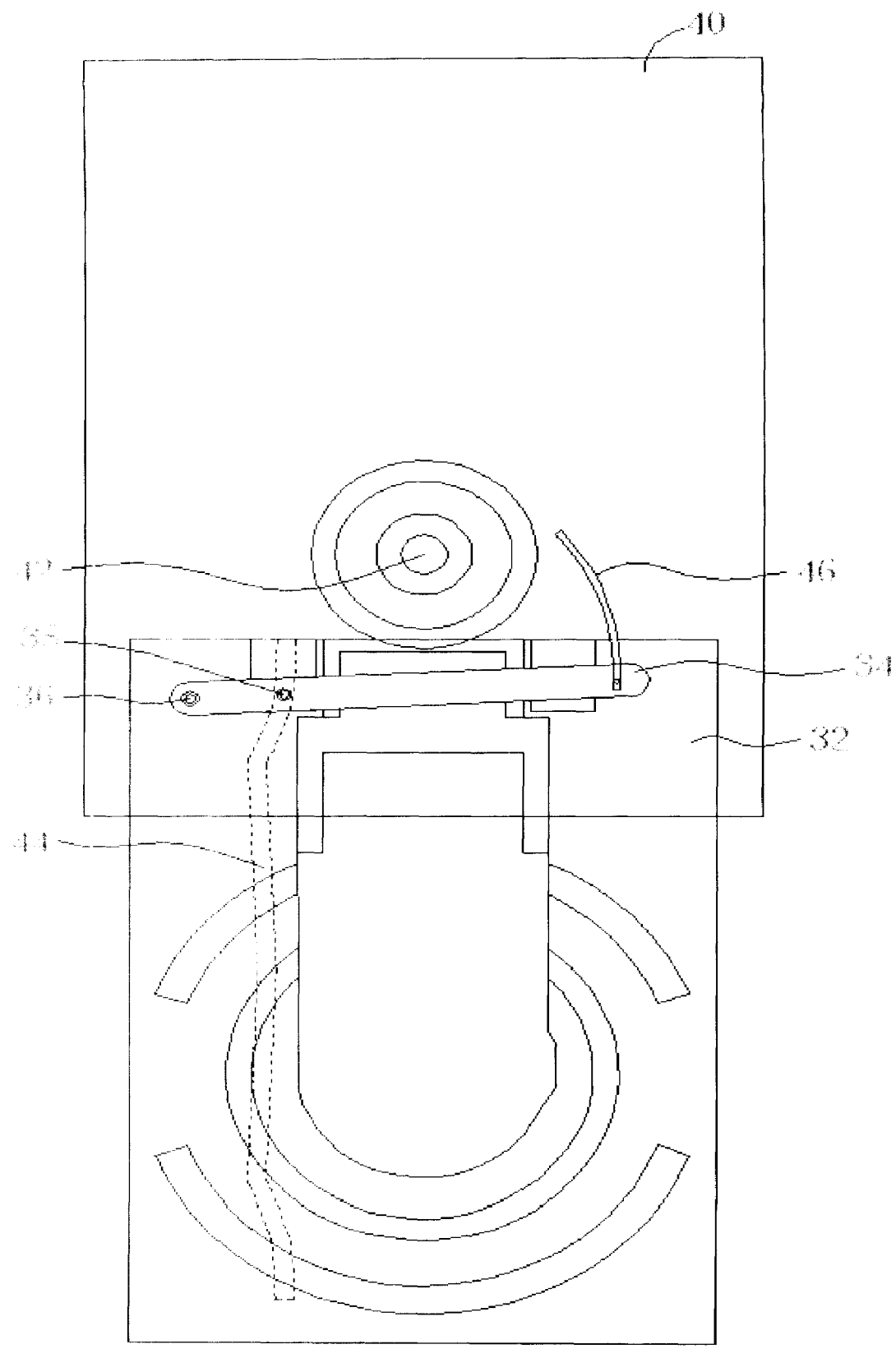

Please refer to FIG. 10 to FIG. 13. FIG. 10 to FIG. 13 are schematic diagrams of withdrawing an optical disk from a CD drive according to the second embodiment of the present invention. As shown in FIG. 10, an optical disk is starting to be withdrawn from the CD drive. While the disk tray 32 starts to exit from the CD drive, the upper cover 40 still covers the entire disk tray 32. The push piece 34 traverses over the upper cover 40, but does not become completely parallel to a cross section of the upper cover 40. That is, there is a small angle between the push piece 34 and the cross section of the upper cover 40 for making the guiding track 44 lead the guiding rod 38 to rotate the push piece 34 counterclockwise. As shown in FIG. 11, the disk tray 32 is exiting from the CD drive. As the disk tray 32 slides out of the upper cover 40, the guiding rod 38 of the push piece 34 moves along a first part of the guiding track 44 that is bent to one side of the disk tray 32 opposite to the pivot 36 of the push piece 34. As a result, the guiding track 44 drives the push piece 34 to turn obliquely to push the clamp 42 upward. As shown in FIG. 12, as long as the optical disk does not completely leave a region covered by the clamp 42 as the disk tray 32 exits from the CD drive, the guiding rod 38 of the push piece 34 moves along a second part of the guiding track 44 that is straight so that the push piece 34 is diagonally located on the upper cover 40 for protecting the optical disk. After the optical disk has left the region covered by the clamp 42, the guiding rod 38 of the push piece 34 moves toad third part of the guiding track 44 that is bent to one side of the disk tray 32 opposite to the pivot 36 of the push piece 34. Therefore, the guiding track 44 can lead the guiding rod 38 to rotate the push piece 34 clockwise so that the push piece 34 can return to its initial location. As shown in FIG. 13, the optical disk has been withdrawn from the CD drive completely, and the disk tray 32 has exited from the CD drive. At the same time, the disk tray 32 has completely left the region covered by the upper cover 40, and the push piece 34 has returned to its initial location. Additionally, the process for loading an optical disk into the CD drive is reverse to the process for withdrawing an optical disk from the CD drive. That is, the steps of FIG. 13 to FIG. 10 illustrate the process for loading an optical disk into the CD drive, and the detailed description will be omitted herein.

As described above, the CD drive of the present invention utilizes the push piece 32 and accompanying guiding track 44 to prevent the clamp 42 from scraping a surface of the optical disk as the optical disk is loaded into or withdrawn from the CD drive. In the first embodiment, the push piece 34 is installed on the disk tray 32 and the guiding track 44 is disposed on the upper cover 40. The guiding track 44 is thereby used to lead the guiding rod 38 to rotate the push piece 34 to push the clamp 42. In the second embodiment, the push piece 34 is installed on the upper cover 40 and the guiding track 44 is disposed on the disk tray 32. The guiding track 44 is utilized to guide the guiding rod 38 to rotate the push piece 34 to push the clamp 42. Both the first and the second embodiments can effectively prevent the clamp 42 from scraping a surface of the optical disk as the optical disk is loaded into or withdrawn from the CD drive.

In contrast to the prior art, the present invention provides a push piece and a guiding track, which is used to guide the push piece to push a clamp to prevent the clamp from scraping a surface of an optical disk as the optical disk is loaded into or withdrawn from the CD drive. As a result, the CD drive of the present invention can effectively prevent the clamp from scraping an optical disk. As mentioned above, the prior art provides a magnet in a clamp so that the clamp can magnetically attract an upper cover as an optical disk is loaded into or withdrawn from a CD drive. However, the magnetic attracting forces produced by the magnet decrease as temperature increases so that the prior art cannot effectively prevent the clamp from scraping an optical disk.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A CD drive comprising:
   a upper cover having a track, the track having a curved section;
   a disk tray installed below the upper cover in a slidable manner;
   a clamp installed on the upper cover in a moveable manner;
   a push piece installed on the disk tray, one end of the push piece pivotally connected to a first side of the disk tray; and
   a guiding rod having a first end fixed on the push piece, and a second end slidably installed in the track;
   wherein when the disk tray slides in or slides out of the upper cover, the guiding rod slides along the track to drive the push piece to push the clamp upward so as to prevent the clamp from scraping an optical disk, and when the disk tray slides out of the upper cover, the track drives the guiding rod to move to the first side so that the push piece rotates to the first side to push the clamp upward, and when the disk tray slides out of the upper cover and the optical disk has left the underside of the clamp, the track drives the guiding rod to move to an opposite side of the first side of that the push piece comes back to the former position.

2. The CD drive of claim 1 wherein the track is a groove etched into the upper cover.

3. The CD drive of claim 2 wherein the push piece has a hole and the first end of the guiding rod is fixed in the hole.

* * * * *